(12) United States Patent
Jun et al.

(10) Patent No.: US 9,498,883 B2
(45) Date of Patent: Nov. 22, 2016

(54) MULTI-JOINT UNDERWATER ROBOT HAVING COMPLEX MOVEMENT FUNCTIONS OF WALKING AND SWIMMING AND UNDERWATER EXPLORATION SYSTEM USING SAME

(71) Applicant: KOREA INSTITUTE OF OCEAN SCIENCE & TECHNOLOGY, Ansan-si, Gyeonggi-do (KR)

(72) Inventors: Bong-Huan Jun, Daejeon (KR); Hyung-Won Shim, Daejeon (KR); Jin-Yeong Park, Daejeon (KR); Bang-Hyun Kim, Daejeon (KR); Hyuk Baek, Daejeon (KR); Pan-Mook Lee, Daejeon (KR)

(73) Assignee: Korea Institute of Ocean Science & Technology, Gyeonggi-do (KR)

( * ) Notice: Subject to any disclaimer, the term of this patent is extended or adjusted under 35 U.S.C. 154(b) by 0 days.

(21) Appl. No.: 14/364,659

(22) PCT Filed: Dec. 13, 2012

(86) PCT No.: PCT/KR2012/010813
§ 371 (c)(1),
(2) Date: Jun. 11, 2014

(87) PCT Pub. No.: WO2013/089442
PCT Pub. Date: Jun. 20, 2013

(65) Prior Publication Data
US 2014/0343728 A1  Nov. 20, 2014

(30) Foreign Application Priority Data

Dec. 15, 2011 (KR) .......................... 10-2011-0135194
Dec. 15, 2011 (KR) .......................... 10-2011-0135580

(51) Int. Cl.
*B25J 9/16* (2006.01)
*B63C 11/52* (2006.01)
(Continued)

(52) U.S. Cl.
CPC ............ *B25J 9/1602* (2013.01); *B62D 57/032* (2013.01); *B63C 11/52* (2013.01); *B63G 8/08* (2013.01);
(Continued)

(58) Field of Classification Search
CPC ...... B25J 9/1602; B62D 57/032; B63G 8/08; B63G 8/14; B63H 19/08; B63H 1/36; B63C 11/52; B63B 2221/22; Y10S 901/01; Y10S 901/15; Y10S 901/28; Y10S 901/46; Y10S 901/47
See application file for complete search history.

(56) References Cited

U.S. PATENT DOCUMENTS

| 3,987,745 A | 10/1976 | Chaverebiere de Sal et al. |
| 4,010,619 A | 3/1977 | Hightower et al. |

(Continued)

FOREIGN PATENT DOCUMENTS

| CN | 101216711 A | 7/2008 |
| CN | 101332604 A | 12/2008 |

(Continued)

OTHER PUBLICATIONS

Jee-Hwan Ryu et al, Control of Underwater Manipulators Mounted on an ROV Using Base Force Information, IEEE Conference on Robotics and Automation, May 2001.*

(Continued)

*Primary Examiner* — Abby Lin
(74) *Attorney, Agent, or Firm* — Lewis Roca Rothgerber Christie LLP

(57) ABSTRACT

Disclosed is an underwater exploration system using a multi-joint underwater robot having a novel complex movement concept in which the multi-joint underwater robot moves through walking or swimming with multi-joint legs closely to a seafloor, differently from a conventional underwater robot to obtain a thrust through a propeller scheme. The underwater exploration system includes the multi-joint underwater robot having the complex movement function according, a depressor, and a mother ship to store data of an underwater state transmitted from the multi-joint underwater robot and to monitor and control a movement direction of the multi-joint underwater robot. The depressor is connected to the mother ship through a primary cable, the multi-joint underwater robot is connected to the depressor through a second cable, and resistance force of the primary cable is applied to the depressor without being transmitted to the multi-joint underwater robot.

13 Claims, 11 Drawing Sheets

(51) Int. Cl.
  *B63G 8/14* (2006.01)
  *B63H 19/08* (2006.01)
  *B62D 57/032* (2006.01)
  *B63H 1/36* (2006.01)
  *B63G 8/08* (2006.01)

(52) U.S. Cl.
  CPC ............... *B63G 8/14* (2013.01); *B63H 19/08* (2013.01); *B63B 2221/22* (2013.01); *B63H 1/36* (2013.01); *Y10S 901/01* (2013.01); *Y10S 901/15* (2013.01); *Y10S 901/28* (2013.01); *Y10S 901/46* (2013.01); *Y10S 901/47* (2013.01)

(56) References Cited

U.S. PATENT DOCUMENTS

| | | | |
|---|---|---|---|
| 5,764,061 A * | 6/1998 | Asakawa et al. | 324/326 |
| 2005/0185684 A1 * | 8/2005 | Stewart et al. | 372/29.02 |
| 2006/0213287 A1 | 9/2006 | Sakano | |
| 2007/0107029 A1 * | 5/2007 | Monroe et al. | 725/105 |
| 2008/0032571 A1 * | 2/2008 | Dudek et al. | 440/12.5 |
| 2008/0276725 A1 | 11/2008 | Pusch | |
| 2009/0007835 A1 * | 1/2009 | Bowen et al. | 114/312 |
| 2009/0294187 A1 * | 12/2009 | Lee et al. | 180/8.6 |
| 2009/0301798 A1 * | 12/2009 | Yang | B62D 57/032 180/8.6 |
| 2011/0229141 A1 * | 9/2011 | Chave et al. | 398/104 |

FOREIGN PATENT DOCUMENTS

| | | |
|---|---|---|
| CN | 101890888 A | 11/2010 |
| JP | S60-18355 A | 1/1985 |
| JP | 61-134885 U | 8/1986 |
| JP | 62-166181 U | 10/1987 |
| JP | H08-71967 A | 3/1996 |
| JP | 2005-153056 A | 6/2005 |
| KR | 10-0873723 | 12/2008 |
| KR | 10-2009-0074547 | 7/2009 |
| WO | WO 2006/070577 A1 | 7/2006 |

OTHER PUBLICATIONS

Tomotaka Inoue et al, Underwater Robot with a Buoyancy Control System Based on the Spermaceti Oil Hypothesis—Development of the Depth control system, IEEE International Conference on Intelligent Robots and Systems, Oct. 2010.*
SIPO Office Action dated Mar. 11, 2015 of the corresponding Chinese Patent Application No. 201280061961.2, (24 pages).
International Search Report of corresponding PCT/KR2012/010813, dated Mar. 26, 2013, 6 pages.
Press release of Ministry of Land, Transport and Maritime Affairs, dated on Apr. 19, 2010, 6 pages.
Ayers, "Underwater walking," Arthropod Structure & Development vol. 33, 2004, pp. 347-360.
Tanaka, et al., "Design Concept of a Prototype Amphibious Walking Robot for Automated Shore Line Survey Work," Oceans '04 MTS/IEEE Techno-Ocean '04, pp. 834-839.
Georgiades, et al., "Simulation of an underwater hexapod robot," Ocean Engineering vol. 36, 2009, pp. 39-47.
Theberge, et al., "Gone Swimmin," IEEE Spectrum vol. 43, No. 6, 2006, pp. 38-43.
Chinese Office action dated Oct. 23, 2015 of counterpart Chinese Patent Application No. 201280061961.2 with English Translation, 21 pages.
Japanese Notice of Submission of Opinion dated Feb. 29, 2016 in counterpart Japanese Patent Application No. 2014-547100 with English translation, 8 pages.
JPO Notice of Allowance dated Aug. 2, 2016 in corresponding Japanese Patent application 2014-547100 with English Translation, (5 pages).

* cited by examiner a. Slow Currents  — Prior Art — b. High Currents c. Backward Currents

MULTI-JOINT UNDERWATER ROBOT HAVING COMPLEX MOVEMENT FUNCTIONS OF WALKING AND SWIMMING AND UNDERWATER EXPLORATION SYSTEM USING SAME

CROSS-REFERENCE TO RELATED APPLICATION(S)

This application is a National Phase Patent Application and claims priority to and benefit of International Application Number PCT/KR2012/010813, filed on Dec. 13, 2012, which claims priority to and benefit of Korean Patent Application Number 10-2011-0135194, filed on Dec. 15, 2011, and Korean Patent Application Number 10-2011-0135580, filed on Dec. 15, 2011, the entire disclosures of which are incorporated herein by reference.

TECHNICAL FIELD

The present invention relates to a multi-joint underwater robot having complex movement functions of walking and swimming and an underwater exploration system using the same. In more detail, the present invention relates to an underwater exploration system using a multi-joint underwater robot having a novel complex movement concept in which the multi-joint underwater robot moves through walking or swimming with multi-joint legs closely to a seafloor, differently from a conventional underwater robot to obtain a thrust through a propeller scheme.

BACKGROUND ART

The average depth of the sea is 3800 m, and the sea occupies 99% of the space in which livings can live. The deep sea occupies 85% of the space, but human beings do not observe even 1% of the deep sea. In addition, the number of species of livings, which are not found on the earth, are estimated as being 10 millions to 30 millions, and only 1.4 thousands of species of livings have been found until now. Most species, which are not found yet, live under the sea. This is reflected by the fact that one new living has been found under the deep sea every two weeks on average for the last 25 years. In addition, as land resources are depleted, the oil production obtained from the deep-sea and gas drilling work is increased every year from 2% in 2002 to 8% in 2009 based on the growth oil production. The oil production obtained from the deep-sea and gas drilling work is expected approximately to 15% based on the growth oil production in 2015. In 2009, Korean ministry of land, transport and maritime affairs and four private enterprises establish "the business group for the development of submarine hydrothermal ore deposit" in 2009, and full-scale commercial development is buckled down in the mine lot of Tonga after 2012. The sea deserves to be hugely explored, and dangerous marine environments do not allow the approach of human beings into the sea. An unmanned underwater robot has been developed as one alternative of the above problem, and has been extensively utilized around the world. In addition, the utilization range of the unmanned underwater robot has been gradually enlarged. Underwater robots may be classified into an unmanned underwater vehicle (UUV), which mainly explores a wide region, and a remotely-operated vehicle (ROV), which performs a near work in a narrower region, according to the roles of the underwater robots. Most underwater robots have used a propeller as a propulsion module. The propeller has been used as an underwater swimmer delivery vehicle, and the theory on the propulsion mechanism of the propeller has been sufficiently established. The efficiency of the propeller is highly shown in a specific field. However, an outer western sea is a special region having the wide range of tide, strong tidal currents, and inferior visibility. Accordingly, there are many difficulties when underwater near works are performed by an underwater robot employing the propulsion scheme of the propeller used for the general purpose. In addition, when the deep sea having sedimentary soil is surveyed with precision, the underwater disturbance is caused due to the play of the propeller.

As underwater robots having a type different from the underwater robot equipped with the propeller, there are underwater robots using a caterpillar and underwater robots having several legs. A lobster robot has been developed as a part of a biomimetic study (Joxkh, A. (2004), "Underwater walking", Arthropod Structure & Development Vol 33, pp 347-360.). Through the above study, the mechanical structure and the walking of a lobster have been analyzed, and a central controller has been developed based on artificial muscle actuators and command neurons. The robot is focused on the biomimetic recognition and a walking study rather than an actual work. In addition, in order to survey the coastline, an amphibious six-leg walking robot has been studied (Tanaka, T., Sakai, H., Akizono, J. (2004). "Design concept of a prototype amphibious walking robot for automated shore line survey work", Oceans '04 MTS/IEEE Techno-Ocean '04, pp 834-839.). A waterproof underwater joint has been developed through the robot, and the robot is improved several times and light weighted. However, studies and research are focused on expanding from robots on the ground to underwater robots, so that active studies and research are not achieved in terms of hydromechanics. Meanwhile, land and water robots with six pedals, which are designed to walk and swim by using the pedals, have been developed. However, the land and water robots has a simple structure in which each pedal represents only one degrees of freedom, and not the structure of a robot having multi-legs with multi-joints (Christina, G., Meyer, N., Martin, B., "Simulation of an underwater hexapod robot," Ocean Engineering, Vol 36, pp 39-47, 2009, Theberge, M. and Dudek, G., "Gone swimming [seagoing robots]", IEEE spectrum, Vol 43, No 6, pp 38-43, 2006.).

Underwater robots are named unmanned underwater vehicles (UUV), and mainly classified into autonomous underwater vehicles (AUVs) and remotely-operated vehicles (ROVs). The AUV is mainly used for scientific survey or search in a region ranging from several hundred meters to several hundreds kilometers. Most AUVs, which has been developed until now, are utilized for scientific research or a military object. ROVs are utilized for underwater survey or a near work with location precision of several tens centimeters or less. The ROVs are utilized for various works such as the maintenance of underwater pipelines and underwater structures, in addition to the burial of underwater cables.

The applications of the ROVs are summarized as follows. First, the ROV searches for a sunken ship, performs a pulling work, and prevents oil from being spilled from the sunken ship. Second, the ROV performs a marine scientific research, and explores and develops marine resources. Third, the ROV mounts an underwater structure therein, supports the survey of the underwater structure, and performs maintenance of the underwater structure. Fourth, the ROV is utilized for the military purpose such as marine search and marine removal.

The ROV for an underwater work mainly obtains two types of mobility. First, the propeller scheme is effective in a cruising type of vehicle such as the AUV, but does not provide control stability to the ROV performing the near work. This is because hydrodynamic fore is non-linearly applied to the ROV underwater, and the thrust force represents strong non-linearity properties such as a dead zone, a response delay, and saturation. In particular, when the ROV is exposed to the strong sea currents such as the tidal currents of the Korean western sea, the stability in the posture of the ROV and the mobility of the ROV may not be ensured. Accordingly, locating and manipulating with precision are difficult, and a clear ultrasonic image may not be obtained, so that most underwater works may be impossible. The directions of tidal currents are changed four times a day. The maximum flow rate in the Korean western sea reaches the range of three knots to seven knots. In a conventional submarine, a steering work is indispensably instable and high energy consumption is required under the strong tidal current environment.

Second, the caterpillar propulsion scheme does not allow the vehicle to be driven in irregular seafloor topography or a region having obstacles, and the vehicle may disturb the seafloor due to the characteristic of the driving scheme of the vehicle. Since the seafloor always has various obstacles including sunken ships, fisheries, ropes, and wasted nets, and seafloor topography restrictions such as rocks and soft grounds, it is difficult for the vehicle to drive through a caterpillar scheme. In addition, most underwater surveys are in-situ surveys that must be performed while minimizing the disturbance under an environment that the disturbance is not caused. The use of the ROV under the above environment is difficult.

Hereinafter, the technical limitations of the underwater works according to the related art will be summarized again.

Safety

When a diver personally participates in the underwater work, there are various dangerous elements, such as decompression sickness, for the diver.

Working Time

The time in which the diver can work without decompression is limited to 30 minutes at the water depth of 21 m, and to 5 minutes at the water depth of 40 m.

Tidal Current

The directions of tidal currents are changed four times a day. The maximum flow rate in the Korean western sea reaches the range from three knots to seven knots. The tidal current is a dangerous target that it is difficult for the underwater robot as well as the diver to overcome. The conventional submarine using the propeller has controllability that is unavoidably unstable under the strong tidal environments and high energy consumption.

Inferior Visibility

One of characteristics of the Korean western sea is in inferior visibility. Although the visibility varies with regions and times, many regions have the visibility only in the range of 20 cm to 30 cm.

Obstacles and Irregular Seafloor Topography

Various obstacles such as sunken ships, fisheries, ropes, and wasted nets, and seafloor topography restrictions such as rocks always exist, which block the works of the diver and the underwater robot, and even threaten the life of the diver.

Environmental Interference

The underwater robots employ a propeller scheme or a caterpillar scheme unavoidably disturbs the seafloor. Many underwater surveys must be performed under an environment without disturbance.

To overcome the strong tidal currents and the inferior visibility is the big limitation in a technology using a robot (unmanned underwater robot) among conventional underwater work technologies. HEMIRE (having the size of L3.3 m×W1.8 m×H2.2 m) receive the resistance force of about 200 kg at the tidal currents of 2 knots, and a cable having the length of 200 m and the diameter of 20 mm receives the resistance force of about 240 kg. Increasing the thrust to overcome the resistance force increases the total weight and the total size, which cannot fundamentally solve the above problem.

DISCLOSURE

Technical Problem

An object of the present invention is to provide a multi-joint underwater robot having complex movement functions as a unit to compensate for the problems occurring in a propeller scheme or a caterpillar scheme, and an underwater exploration system using the same.

Another object of the present invention is to provide a multi-joint underwater robot having complex movement functions of walking and swimming, capable of performing an underwater work without the environment disturbance in sedimentary soil caused by the playing of a propeller, and an underwater exploration system using the same.

Technical Solution

In order to accomplish the above objects, there is provided an underwater exploration system using a multi-joint underwater robot having a complex movement function. The underwater exploration system includes the multi-joint underwater robot having the complex movement function, a depressor, and a mother ship to store data of an underwater state transmitted from the multi-joint underwater robot and to monitor and control a movement direction of the multi-joint underwater robot. The depressor is connected to the mother ship through a primary cable, the multi-joint underwater robot is connected to the depressor through a second cable, and resistance force of the primary cable is applied to the depressor and not transmitted to the multi-joint underwater robot.

Preferably, the multi-joint underwater robot includes a first switching hub to switch a plurality of signals, an optical fiber converter to convert a received signal into an optical signal, a computer connected to the first switching hub to process input and output signals, RS232, RS485, USB, and CAN devices connected to the computer, a second switching hub having one terminal connected to the first switching hub and an opposite terminal connected to a plurality of network cameras, a video encoder having one terminal connected to the first switching hub and an opposite terminal connected to a plurality of analog cameras, a forward scanning sonar serving as a forward looking sonar, connected to the first switching hub, photographing an image through a forward scanning work, and transmitting the image, and an ultrasonic camera connected to the first switching hub and photographing and transmitting a forward image.

Further, preferably, the depressor includes a switching hub switching a plurality of signals, an optical fiber converter connected to the switching hub to convert a signal, which is received through the switching hub, into an optical signal and to transmit the signal to the mother ship, a computer processing input and output signals and having one terminal connected to an RS232 and an opposite terminal connected to the switching hub, a video encoder having one terminal connected to a plurality of analog cameras and an opposite terminal connected to the switching hub, and a plurality of network cameras connected to the switching hub.

In addition, preferably, the mother ship includes first and second optical fiber converters, each of which has one terminal connected to a plurality of computers and an opposite terminal to transmit an optical signal, and the first and second optical fiber converters are connected to an optical fiber converter of the multi-joint underwater converter and an optical fiber converter of the depressor, respectively.

Preferably, the multi-joint underwater robot includes a streamlined body, multi-joint walking legs mounted at left and right sides the body and having multiple joints, a control unit mounted in the body, a walking leg driving unit controlled by the control unit to drive the multi-joint walking legs, a sensing unit mounted in the body to sense a posture of the body and contact with an external object, a buoyancy sensing unit, and a communication unit to transceive wired and wireless signals with an external device. The control unit controls a walking state and a swimming state through the multi-joint walking legs.

In addition, the buoyancy sensing unit variably adjusts a weight of the multi-joint underwater robot in a range of −10 kg to +10 kg, and two front legs among the multi-joint walking legs have grippers such that the front legs selectively have a robot arm function.

Advantageous Effects

As described above, in the underwater exploration system using the multi-joint underwater robot having the complex movement function according to the present invention, the underwater robot has six legs of a novel concept completely different from a conventional propeller propulsion scheme to move closely to the seafloor, overcome tidal currents while maintaining the posture thereof by using the posture and motion sensor, and swim and walk under water. In addition, the underwater robot transmits underwater data to the mother ship on the ground via the depressor through the communication unit in real time, thereby performing underwater exploration in shallow sea and deep sea.

Further, in the underwater exploration system using the multi-joint underwater robot having the complex movement function according to the present invention, ultrasonic image equipment is mounted in the underwater robot, so that a search work is possible even under the water representing high turbidity. The two front legs are used as robot arms, so that the underwater exploration can be effectively performed in the shallow sea and the deep sea.

BEST MODE

Mode for Invention

Figure 1A:
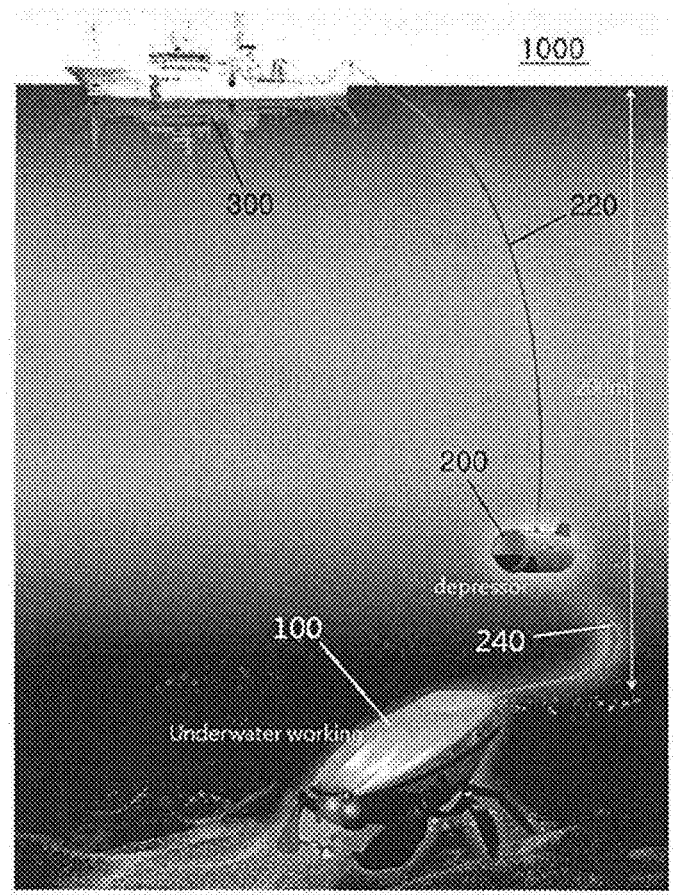
FIGS. 1a and 1b are schematic views showing an underwater exploration system using a multi-joint underwater robot having a complex movement function according to the present invention.

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims. In the following description, the same reference numerals will be assigned to the same elements.

Hereinafter, a multi-joint underwater robot having a complex movement function according to an exemplary embodiment of the present invention will be described in detail with reference to accompanying drawings.

Figure 1B:
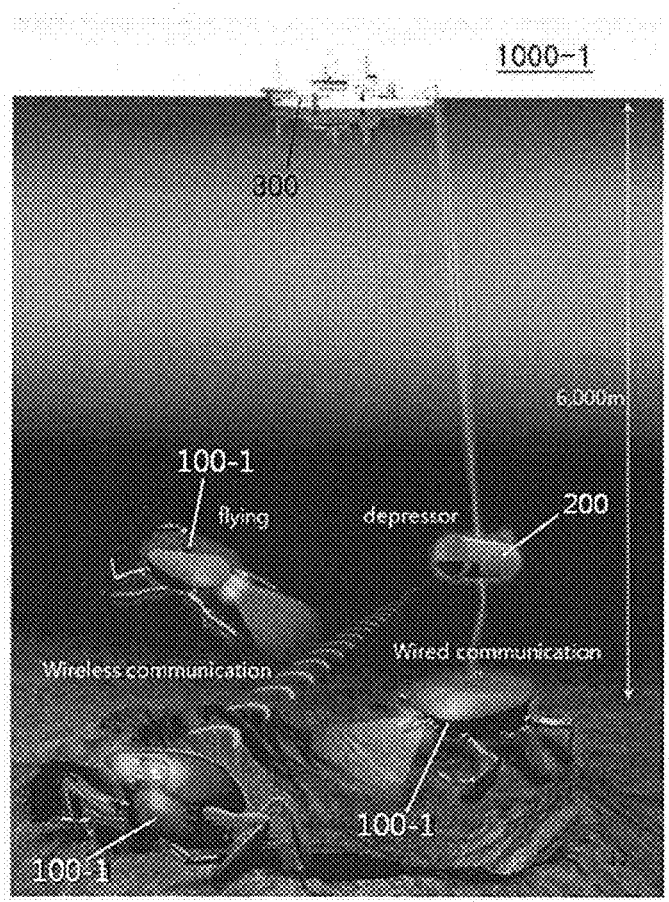

FIGS. 1a and 1b are schematic views showing an underwater exploration system using the multi-joint underwater robot having the complex movement function according to the present invention.

FIG. 1a shows the state that an underwater exploration system 1000 using a multi-joint underwater robot 100 having a complex movement function according to the present invention allows the multi-joint underwater robot 100 having the complex movement function to reach 200 m underwater and walk. The multi-joint underwater robot 100 is connected to a depressor 200 through a secondary cable 240, and the depressor 200 is connected to a mother ship 300 through a primary cable 220. The resistance of the primary cable 220 is applied to the depressor 200, and not applied to the multi-joint underwater robot 100.

The underwater exploration system 1000 using the 200 m-exploration multi-joint underwater robot 100 having the complex movement function is operated by employing the depressor 200 to minimize the influence exerted on the multi-joint underwater robot 100 by hydrodynamic force applied to a tether cable under a strong tidal current environment. The underwater exploration system 1000 performs two following tasks.

Investigation and Observation of Underwater Structures or Sunken Ships

The multi-joint underwater robot 100 moves closely to a seafloor under a strong tidal current environment to approach an underwater structure or a sunken ship, and investigates and observes the structure under an inferior visibility environment by using optical and sounding equipment.

The multi-joint underwater robot 100 performs wire cutting, grinding, and drilling works with a robot arms in order to investigate and observe the underwater structure or the sunken ship.

Marine Scientific Research at Neritic Region

The multi-joint underwater robot 100 moves while walking with multiple legs at an underwater environment within 200 m to minimize underwater disturbance and to acquire scientific research data required for the studies on marine physics, chemistry, biology, and geology.

The multi-joint underwater robot 100 collects samples of organisms, soil, and water required for scientific research at an underwater environment within 200 m.

FIG. 1b shows the state that an underwater exploration system 1000-1 according to another embodiment of the present invention allowing exploration through complex movement up to 6,000 m reaches 6,000 m underwater, swims, and walks. A multi-joint underwater robot 100-1 is connected to the depressor 200 through a cable, and the depressor 200 is connected to the mother ship 300 through a cable. The depressor 200 and the multi-joint underwater robot 100-1 may make wired or wireless communication.

The underwater exploration system 1000-1 using the multi-joint underwater robot 100-1 having the complex movement function for the purpose of 6,000 m exploration is designed for an abyssal environment rarely having tidal currents, and operated by employing the depressor 200 to minimize the influence exerted on the multi-joint underwater robot 100-1 by the weight of a tether cable. The multi-joint underwater robot for the abyssal environment has a buoyancy adjusting function to minimize the disturbance of sedimentary layers in a deep sea and to prevent legs of the multi-joint underwater robot from being fallen into seafloor soil. The underwater exploration system 1000-1 performs two following tasks.

Marine Scientific Research in Deep Seam

The multi-joint underwater robot 100-1 minimizes the seafloor disturbance under the abyssal environment having a soft ground including while acquiring scientific research data required for the studies on marine physics, sedimentary soil chemistry, biology, and geology.

The multi-joint underwater robot 100-1 collects samples of organisms, soil, and water required for scientific research on a seafloor up to 6,000 m.

Long-Term Precision Survey of Seafloor

The multi-joint underwater robot approaches a seafloor and precisely surveys irregular seafloor topography, such as a seafloor hydrothermal deposit.

At a wireless autonomic control mode, the multi-joint underwater robot is separately operated without the depressor, and observes a predetermined area for a long term while minimizing energy consumption.

Figure 2:
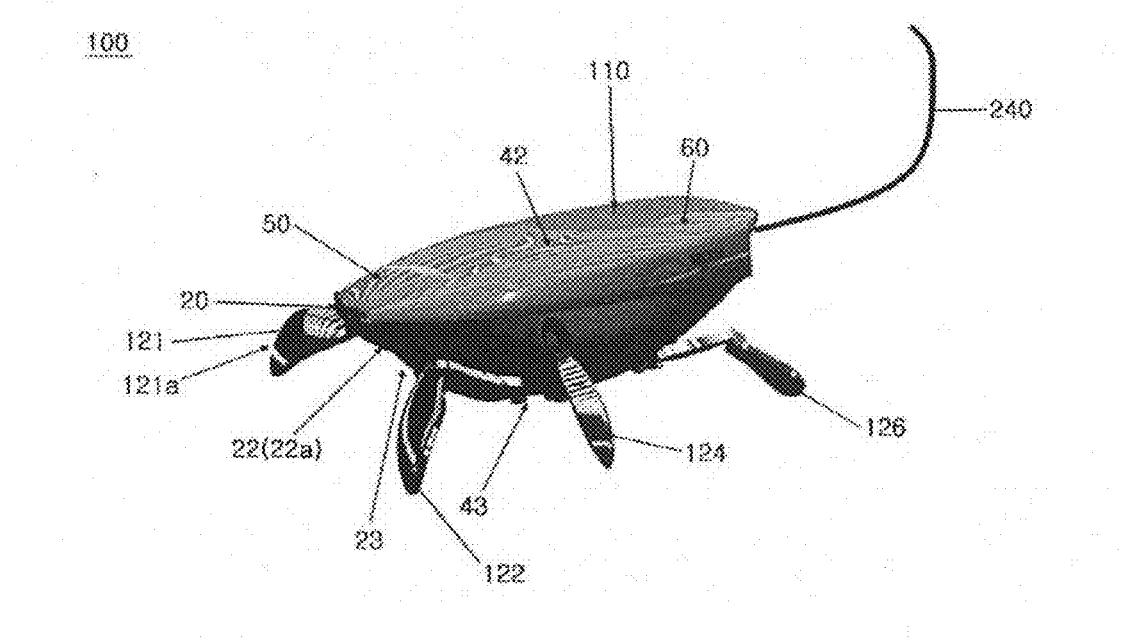
FIG. 2 is a perspective view showing a multi-joint underwater robot having a complex movement function according to the embodiment of the present invention.

According to the present invention, a novel underwater robot different from a submergence vehicle employing a propeller scheme according to the related art overcomes limitations of the related art. To this end, a multi-joint underwater robot having a complex movement function is disclosed as shown in FIG. 2. The limitations of the related art described in the related art can be overcome through following concepts.

In relation to safety, the underwater robot is used for a predetermined work instead of a diver at an environment dangerous for the diver to perform the predetermined work.

In relation to a working time, the limitation in the diving time of the diver is overcome by using the multi-joint underwater robot.

In relation to tidal currents, the multi-joint underwater robot is kept in a posture to increase landing force on the seafloor, thereby overcoming tidal currents, and the depressor 200 is provided between the multi-joint underwater robot 100 and the mother ship 300 to minimize the influence exerted on the multi-joint underwater robot 100 by the current force applied to the cable.

In relation to an inferior visibility, various ultrasonic imaging devices, which are relatively slightly affected by turbidity, are utilized and an optical camera is utilized for close check.

In relation to obstacles and irregular seafloor topography, the multi-joint underwater robot is landed on the seafloor with multiple legs thereof to maintain static stability, and kept in a desired body posture with multi-joint legs even in the irregular seafloor topography while walking.

In relation to environmental interference, the multi-joint underwater robot moves and works through an underwater walking scheme to minimize underwater disturbance.

According to the present invention, four core technologies are defined to develop a multi-joint underwater robot having a complex movement function and the approaching scheme for technology development is suggested. An underwater robot, which is newly suggested, is a novel underwater robot moving through walking and swimming with multi-joint legs closely to the seafloor, different from a conventional underwater robot to obtain a thrust through a propeller scheme.

The underwater robot is named "Crabster" because the underwater robot moves and works on a seafloor similarly to crabs or lobsters.

The multi-joint underwater robot according to the present invention searches for a sunken ship and performs marine scientific research on a seafloor at the water depth of 200 m of littoral sea in our nation (or performs marine scientific research on a seafloor at the water depth of 6,000 m). In particular, the multi-joint underwater robot may work under an environment of the western sea having strong tidal currents and inferior visibility, and have a swimming function and a walking function without environmental disturbance in sedimentary soil Table 1 shows schematic data of embodiments of the multi-joint underwater robot having the complex movement function according to the present invention shown in FIGS. 1a and 1b.

TABLE 1

| Item | | 200 m underwater robot | 600 m underwater robot |
|---|---|---|---|
| Basic data (in folding of legs) | Length | 2.2 m | 2.2 m |
| | Width | 1 m | 1 m |
| | Height | 1.1 m | 1.1 m |
| | Maximum weight | 300 kg (in air) | 300 kg (in air) |
| | Maximum ground clearance | 0.5 m or more | 0.5 m or more |
| Number of legs | Walking legs | four 4 DOFs two 6 DOFs | four 4 DOFs two 6 DOFs |
| | Robot legs used as arms | 0.5 m/sec (1.8 km/h) | 0.5 m/sec (1.8 km/h) |
| Maximum specification | Maximum walking speed | 200 m | 200 m |
| | Maximum water depth for operation | 2 knots | 0.5 knots |
| | Maximum overcome tidal speed | 20 kW or less | 20 kW or less |
| Conquest capability of sea state | Maximum power consumption | Sea state 3 Sea state 4 | Sea state 3 Sea state 4 |
| Main exploration equipment | Maximum working condition | Forward scanning sonar | Forward scanning sonar |
| | Maximum survival condition | Ultrasonic camera | Optical camera |
| Precision of underwater location | Long distance of 10 m or more Short distance of 10 m or more | ±2 m or less ±0.1 m or less | ±5 m or less ±0.1 m or less |
| Operating scheme | Precision of absolution location | Wired remove control | Hybrid scheme of wired and wireless schemes |
| Control scheme | Precision of relative location | Remote control | Mixing control of remote and autonomic controls |
| Operating time | | Continuous operation | Continuous (wired), 8 hours or more (wireless) |
| Main functions | | Functions of overcoming strong tidal currents and inferior visibility | Buoyancy adjusting function and an underwater swimming function. |

As shown in table 1, the number of walking legs is four, and the number of legs used as arms is two.

In addition, the multi-joint underwater robot according to the present invention is equipped with a device to detect inferior visibility under water. Regarding the fundamental data of the multi-joint underwater robot, the multi-joint underwater robot has the total length of 2.2 m, the width of 1 m, the height of 1.1 m, the maximum weight of 300 kg (including loaded weight), and the maximum ground clearance of 0.5 m. In addition, regarding the number of legs, the multi-joint underwater robot has four 4 DOFs as walking legs, and two 6 DOFs as legs used as robot arms. Regarding the maximum specifications, the multi-joint underwater robot has the maximum walking speed of 0.5 m/sec (1.8 km/h), is operable at the water depth of up to 200 m, overcomes the tidal speed of up to 2 knots, and requires the power consumption of up to 20 kW. Regarding the conquest capability of a sea state of the multi-joint underwater robot, the maximum operating condition is "Sea state 3", and the maximum survival condition is "Sea state 4". Regarding a detection capability under an inferior visibility environment, the multi-joint underwater robot may make detection to two types of detection distances of 100 m or more and 10 m or more. In other words, the multi-joint underwater robot is equipped with a forward scanning sonar, which performs forward-scanning to the maximum detection distance of 100 m or more under water, and an ultrasonic camera which provides real-time sonar images to the maximum detection distance of 10 m or more, so that the visibility can be ensured under the inferior visibility environment. The control scheme is a wired remote control scheme, and power is supplied through a tether cable.

Hereinafter, functions required for the multi-joint underwater robot having a complex movement function will be summarized again.

Function

Landing on a seafloor to adjust a body posture with multi-legs having multi-joints and to move through walking.

Mounting two robot arms for underwater operation.

Mounting ultrasonic imaging devices to overcome inferior visibility.

Embedded turbidity, dissolved oxygen, conductivity, temperature, depth, and pH measurement sensors.

Real-time remote monitoring for all underwater robot information.

Function of stabilizing posture coping with upset caused by irregular topography and disturbance such as tidal currents and of correcting gait.

Pressure-Resistant and Waterproof Scheme

Pressure-resistant and waterproof performance in stable structure at water depth of 200 m.

Operation ensurance with insulating oil in the case of oil-filled waterproof system such as a rotor system.

Anti-corrosion function against sea water and salt.

Robustness

Operation at sea state 3, and survival at seat state 4.

Moving and working at sea current of 2 knots and survival at a seat current of 3 knots.

Normal operation at temperature of −10 to 40, and survival at temperature of 30 to 75.

Reliability

Continuously availability for 24 hours under water and on sea.

Maintaining of internationally authorized reliability of scientific research data.

Operating Convenience

Possibility of launching and pulling under seat state 3 or less.

Installation of a user graphic interface for convenience of manipulator.

Reduction of burden of a manipulator by partially providing automation function.

Maintenance

Easy disassembling, assembling, and replacing of the underwater robot 100 and supporting devices thereof.

Manufacturing in a module, and ensurance of sufficient extra product.

Various usages of a mother ship and ensurance of easy packaging, moving, and mounting.

Scalability

Ensurance of communication and power lines of extra channels for additional equipment.

Replacement of robot arms of underwater working tools.

Function of Coping with Emergency State

The underwater robot 100 transmits underwater location thereof by using its own power for three days or more when underwater robot 100 is mechanically disconnected from a remote system.

The underwater robot 100 ensures a function of recovering the posture thereof for itself or by the aid of a remote support system when the underwater robot is upset due to excessively sharp inclination of a seafloor, instantaneous sea current, or mistake in operation.

Although the 6,000 m-exploration multi-joint underwater robot according to the present invention is similar to the 200 m-exploration multi-joint underwater robot, the 6,000 m-exploration multi-joint underwater robot is hardly affected by tidal currents and aims at performing scientific research under a stabilized deep-sea environment having a superior visibility. Accordingly, the 6,000 m-exploration multi-joint underwater robot is additionally equipped with a buoyancy adjusting function and a swimming function to minimize the sedimentary disturbance. In addition, the 6,000 m-exploration is additionally equipped with a wireless communication function and an autonomic control function to expand an exploration type and an exploration scheme.

Hereinafter, the approaching scheme of the development of an underwater joint mechanism of the multi-joint underwater robot according to the present invention is summarized as shown in following table 2.

TABLE 2

| Required main functions | | Approaching schemes of Technology Development |
|---|---|---|
| Mechanical Field | Pressure-resistant/waterproof | Development of waterproof joint module integrated with motor/gear/bearing. Development of pressure-resistant and waterproof structure of a rotor system by an oil filled type O-ring structure. |
| | Scheme | Application of corrosion-resistant materials such as aluminum and a stainless material. Application of oil-filled type design according to a scheme of filling insulating oil. Installation structure of sacrifice anodes. |
| | Zero backlash | Employment of harmonic drive reducer. |
| | Lightness | Optimal design based on a structure analysis. Usage of light and high stiffness material. |
| Electrical Field | Small, light, and high-power joint | Employment of a low-speed and high-torque BLDC motor. Design of a heat radiation structure by using sea water and filled oil. |
| | Joint location Feedback | Application of a hall center-type proximity limit sensor. Application of electrical absolute location encoder. |
| Control Field | Fault tolerant | Application of the design of a compliance controller. |

As shown in Table 2, the pressure-resistant/waterproof is required in a mechanical field as a main function required for an underwater joint mechanism, the waterproof joint module integrated with a motor/gear/bearing is developed, and a pressure-resistant and waterproof structure of a rotor system by an oil filled type O-ring structure is developed. In the scheme, corrosion-resistant materials such as aluminum and a stainless material are applied, an oil filled type design is applied according to a scheme of filling insulating oil, and the installation structure of sacrifice anodes is applied. In addition, a zero backlash is achieved by employing a harmonic drive reducer, the optimal design based on a structure analysis is performed, and a light and high stiffness material is used.

In the electrical field, a low-speed and high-torque BLDC motor is employed to provide a small, light, and high-power underwater robot having joints, a heat radiation structure is designed by using sea water and filled oil, and a hall center-type proximity limit sensor and an electrical absolute location encoder are applied. In the control field, the design of a compliance controller is applied.

Hereinafter, the structure of the multi-joint underwater robot according to the present invention will be described in more detail with reference to FIGS. 2 and 3.

FIG. 2 is a perspective view schematically showing the multi-joint underwater robot according to the embodiment of the present invention. The shape of the multi-joint underwater robot is provided for an illustrative purpose, and the outer appearance of the multi-joint underwater robot may be modified.

Referring to FIG. 2, the multi-joint underwater robot 100 includes a streamlined body 110, multi-joint walking legs having multiple joints and including a plurality of paired legs mounted in left and right sides of the body, respectively, a control unit mounted in the body to control a walking state and a swimming state under water through the multi-joint walking legs, a walking leg driving unit controlled by the control unit and generating a driving signal to drive the multi-joint walking legs, a sensing unit mounted in the body to sense the posture of the body and the contact with an external object, a buoyancy sensing unit mounted in the body to detect the buoyancy of the body, and a communication unit to transceive wired and wireless signals with an external device.

The buoyancy sensing unit includes a buoyancy sensor to provide a buoyancy sensing function, and provides a function of adjusting buoyancy of the body according to a signal sensed by the buoyancy sensor.

The sensing unit includes a posture and motion measuring sensor 42, an underwater location tracking device 50, and a force/moment sensor 43 mounted on the bottom surface of the body.

A photographing unit is mounted on a front surface of the body to photograph underwater images, and the photographing unit includes an ultrasonic camera 20, an underwater camera 22 having a pan/tilting function, and a lighting device 22a (not shown).

The communication unit includes an optical communication modem 60.

The communication unit is connected to the depressor through an optical fiber and a secondary cable 240 embedded therein with a power line.

The body is made of light and high-strength complex fiber.

The sensing unit includes moment sensors mounted in two front legs of the multi-joint underwater robot to sense the landing.

The total six multi-joint walking legs 121,122,123 (not shown), 124, 125 (not shown), and 126 are mounted along the edge of the body 110 of the multi-joint underwater robot 100. The multi-joint walking legs 123, 124, 125, and 126 are provided by two at each lateral side of the body 110, and two legs 121 and 122 are provided at the front of the body 110. The two multi-joint walking legs 121 and 122 attached to the front of the body 110 are used as robot arms, which perform functions of legs and arms. Each of the multi-joint walking legs 121, 122, 123, 124, 125, and 126 includes a plurality of joint parts (e.g., joint parts 121a, 121b, 122a, and 122b).

The multi-joint underwater robot 100 having the complex movement function 100 is a six-foot robot or a four-foot robot, which walks on a seafloor, and two front legs of the underwater robot may be utilized as robot arms. The four legs 123, 124, 125, and 126 have four-joint structures actively controlled by an electrical motor, and each of the two front legs has six joints and one gripper. The above concept is distinguished from a lobster robot focused on biomimetic functions and a technology configured with one joint and one pedal (Christina, G., Meyer, N., Martin, B., "Simulation of an underwater hexapod robot," Ocean Engineering, Vol 36, pp 39-47, 2009.). The multi-joint underwater robot 100 is a novel underwater robot to actively control a posture thereof corresponding to a hydrodynamic force.

The leg structure of the multi-joint underwater robot will be described later in detail with reference to FIGS. 9 to 12. When the multi-joint underwater robot is moved, the multi-joint underwater robot can rapidly walk while ensuring stability of the posture thereof by using six legs. When the robot works or carries an object with a leg used as a robot arm, the robot supports the body or walks by using four legs. When the multi-joint underwater robot moves by using four legs, walking stability and a walking speed are relatively decreased as compared with when the multi-joint underwater robot moves by using six legs, but required underwater work and movement can be achieved.

The multi-joint underwater robot 100 having the complex movement function according to the present invention has the streamlined body 110 and multi-joint legs suitable for works under a strong tidal current environment, detects disturbance caused by hydrodynamic force, and controls the postures of the body and the legs to minimize the influence caused by the disturbance.

Figure 3:
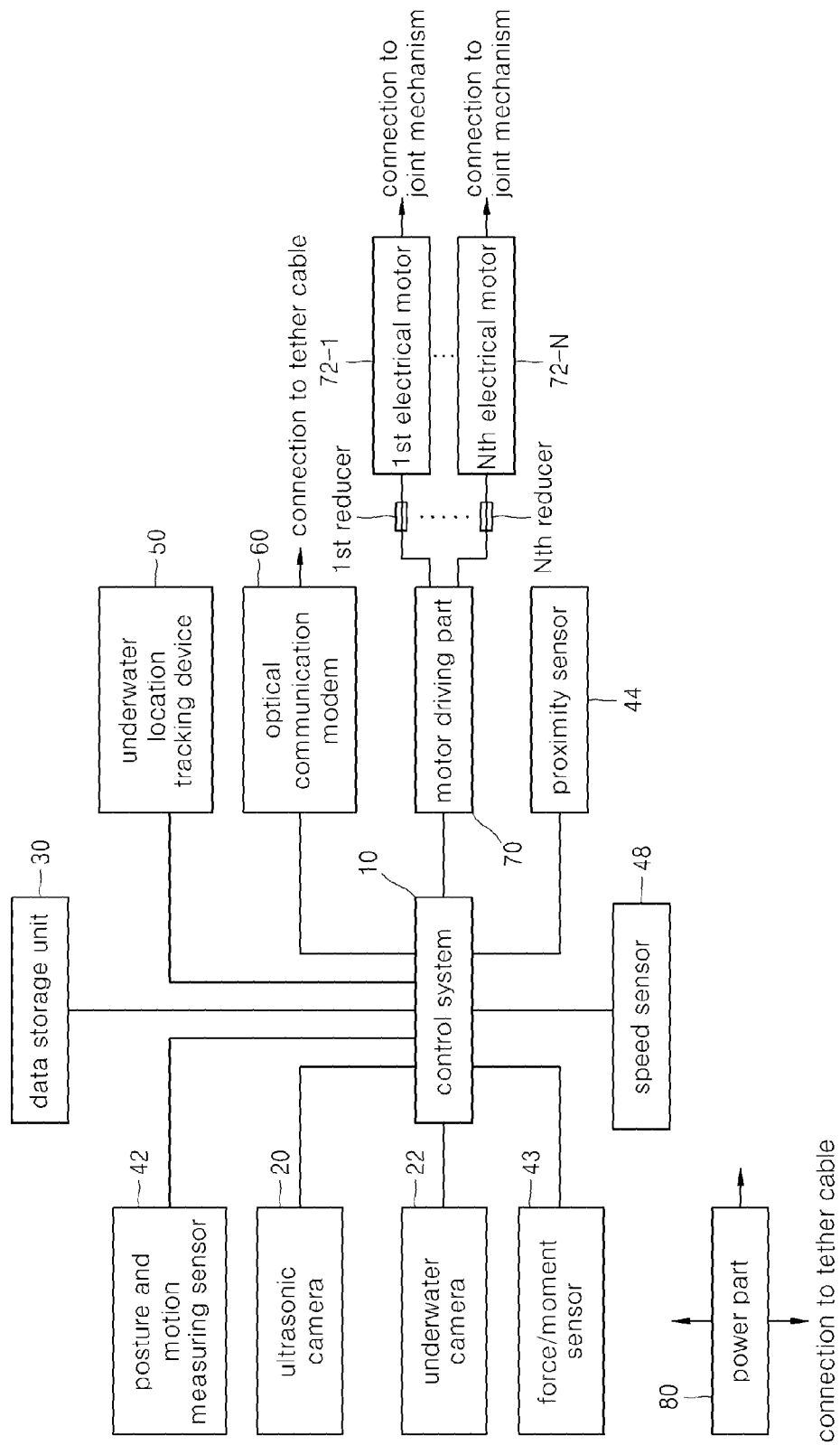
FIG. 3 is a block diagram showing the multi-joint underwater robot having the complex movement function according to the present invention.

FIG. 3 is a block diagram showing the multi-joint underwater robot having the complex movement function according to the present invention.

Referring to FIG. 3, the multi-joint underwater robot 100 having the complex movement function includes a control system 10 to control the swimming and walking procedures of the multi-joint underwater robot 100, the forward scanning sonar 20 to photograph the front to 100 m by using an ultrasonic wave, the ultrasonic camera 20a to take a front image up to 10 m by using an ultrasonic wave in real time, the underwater camera 22 and the lighting device 22a (not shown) photographing an underwater state and having a pan/tilting function allowing rotation and angle change, a data storage unit 30 to store sensed data and photographed image data in swimming and walking, the posture and motion measuring sensor 42 to sense the posture of the multi-joint underwater robot and measure the motion state of the multi-joint underwater robot, the force/moment sensor 43 to sense the force and the moment applied to the walking legs of the multi-joint underwater robot, a proximity sensor 44 to sense the limit of a joint angle, a speed sensor 48 to sense the speed of the multi-joint underwater robot and the flow rate, the underwater location tracking device 50 to track and sense the underwater location of the underwater robot, the optical communication modem 60 to transceive a signal with the depressor, a motor driving part 70 to generate a driving signal of an electrical motor, first to $N^{th}$ electrical motors 72-1, . . . , and 72-N operated according to a signal of the motor driving part, first to $N^{th}$ reducers 74-1, . . . , and 74-N operated according to the electrical motors and connected to a joint mechanism to transfer the operations of the electrical motors, the control system 10, which controls a function of transceiving a signal with the depressor and the mother ship on the ground through the optical communication modem and a function of transmitting input data when swimming and walking of the multi-joint underwater robot, and a power part 80 to supply power.

A force sensor or a detection sensor (not shown) is mounted on the end portion of each leg to sense the landing.

The multi-joint underwater robot having the complex movement function according to the present invention is mounted on the seafloor, connected to the depressor, and connected to the depressor through the mother ship on the ground. The mother ship on the ground receives and stores the photograph information of the seafloor topography through the underwater robot, and transmits a movement command signal in order to explore a specific region.

The multi-joint underwater robot may move along the seafloor surface toward the specific region while walking or swimming. The multi-joint underwater robot changes the posture thereof based on the information of the posture sensor, which is the sensing unit, according to the tidal currents (see FIGS. 6 and 7). In addition, the multi-joint underwater robot prevents an upset accident by making a bending posture against tidal currents surging from the front. In walking, the multi-joint underwater robot checks the landing state of legs through the moment sensor, which is the sensing unit mounted in the multi-joint walking leg, while moving on the seafloor or stops and stands by. In swimming, the multi-joint underwater robot moves in the state that all joints of the multi-joint walking leg are straightly spread. In order to overcome the inferior visibility, the multi-joint underwater robot photographs the exploration region by the ultrasonic camera and the pan/tilting underwater camera (optical camera), which constitute the photographing unit, and moves while illuminating the front surrounding by using a multi-beam lighting device.

The multi-joint underwater robot 100 having the complex movement function according to the embodiment of the present invention has six legs and 28 joints in total and actively walks under water. Each joint is driven by the first to $N^{th}$ electrical motors 72-1, . . . , and 72-N. The technology of mechanically and electrically designing and controlling the joints of the multi-joint underwater robot is referred to as "underwater mechanism technology". A joint mechanism technology applied to a land is expanded or redesigned so that the joint mechanism technology is applicable under seawater.

The joint mechanism refers to a joint mechanism applied to each of six legs of the multi-joint underwater robot according to the present invention. Each leg has a link structure of four joints, and the two front legs have link structures of six joints. The joints constituting the two front legs are utilized when the two front legs are used for robot arms.

Figure 10:
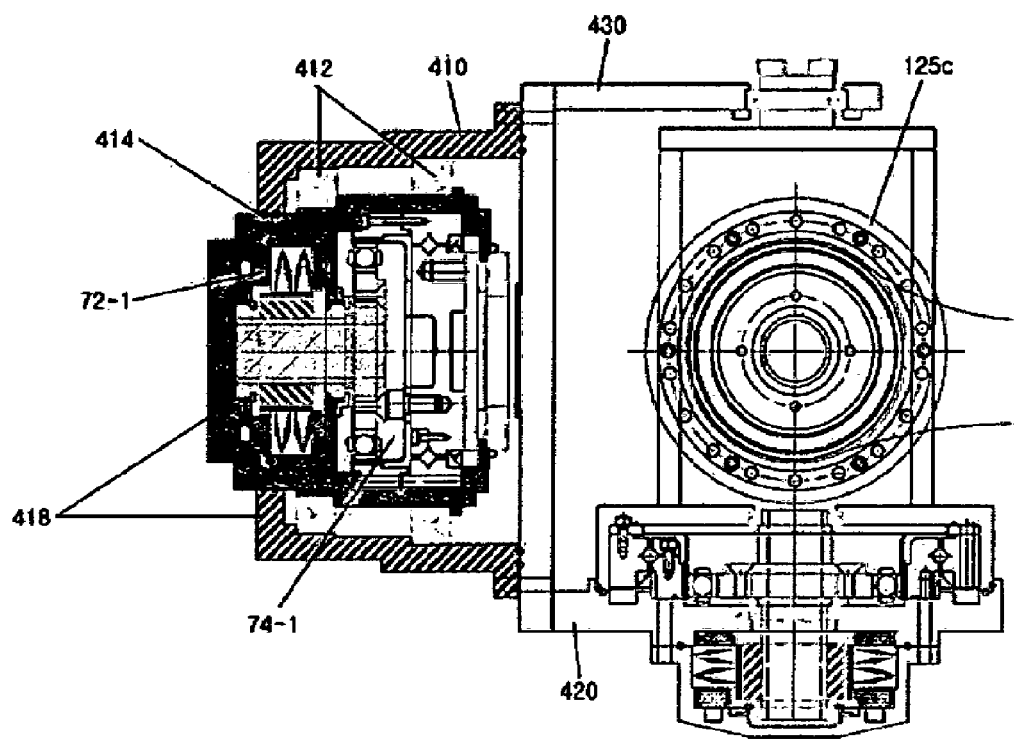
FIG. 10 is a side view showing a portion of a pressure-resistant and waterproof joint structure including the electrical motor and the harmonic reducer of the multi-joint underwater robot according to the exemplary embodiment of the present invention.

Each joint mechanism includes a joint driving motor, a harmonic drive reducer, a joint angular sensor, and a joint limit sensor. The joint driving motor includes a frameless BLDC motor to obtain a low speed and a high toque with lightweight in small size, and is mounted in a pressure-resistant and waterproof housing. The pressure-resistant and waterproof housing is water-tightened by using an O-ring. To minimize the backlash of the joint and obtain a proper deceleration ratio, the harmonic drive reducer is employed. In addition, an electric encoder providing an absolute angle is mounted at the reducer output side of the joint to obtain the absolute of the joint. For safety, a magnetic type of proximity switch is mounted in a joint angular limit, and FIG. 10 shows a joint structure.

Analyzing and Modeling of Hydrodynamic Force Acting on Underwater Robot

Hereinafter, the hydrodynamic force acting on the multi-joint underwater robot having the complex movement function according to the present invention will be described. Since water is a fluid having the density approximating to 1000 times the density of air, the underwater robot operating under water has a dynamic characteristic in which the hydrodynamic force is not ignored. A computational fluid dynamic (CFD) scheme using a tool for numeric value calculation ("ANSYS") is applied to the present invention in order to analyze the hydrodynamic force.

Figure 4:
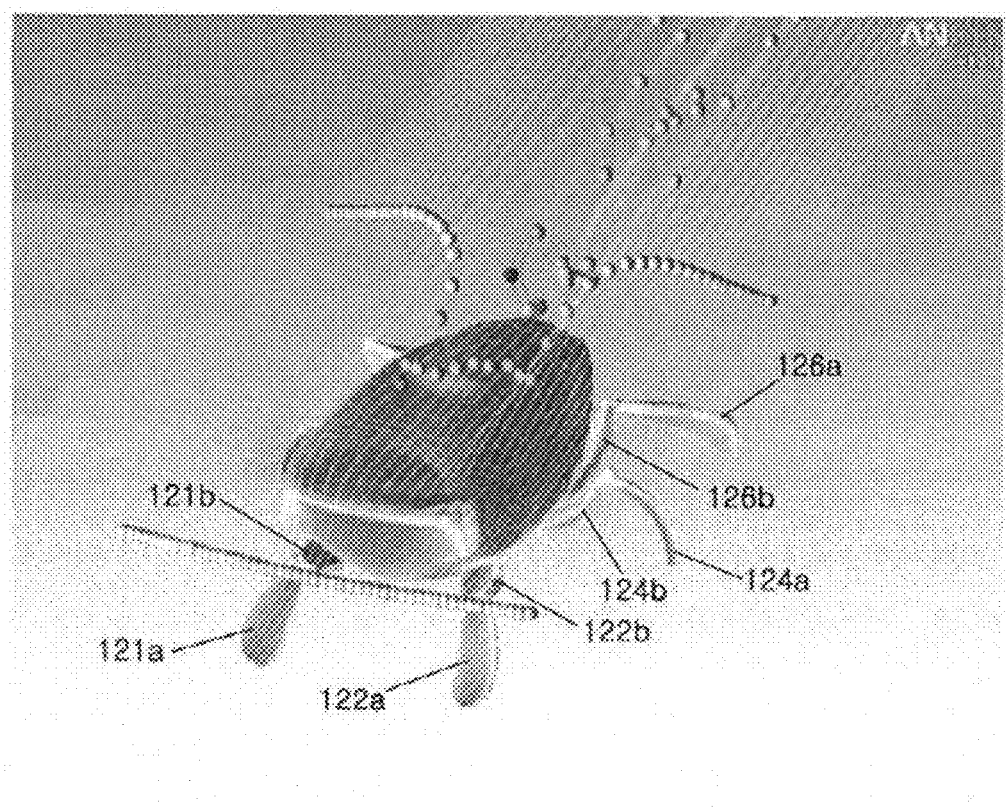
FIG. 4 is a graph showing a simulation state that the distribution of pressures applied to an underwater robot located in a fluid having a flow rate is estimated through a CFD scheme based on the conceptual design of the underwater robot according to the present invention.

FIG. 4 is a graph showing a simulation state that the distribution of pressures applied to the underwater robot located in a fluid having a flow rate is estimated through the CFD scheme based on the conceptual design of the underwater robot according to the present invention. The hydrodynamic force applied to the underwater robot may be calculated and analyzed according to the postures of the underwater robot and the direction of the fluid through the above procedure.

As shown in FIG. 4, the underwater robot includes legs 121a, 121b, 122a, and 122b used as robot arms among walking legs, right walking legs 124a, 124b, 126a, and 126b, and left walking legs 123a, 123b, 125a, and 125b.

Figure 5:
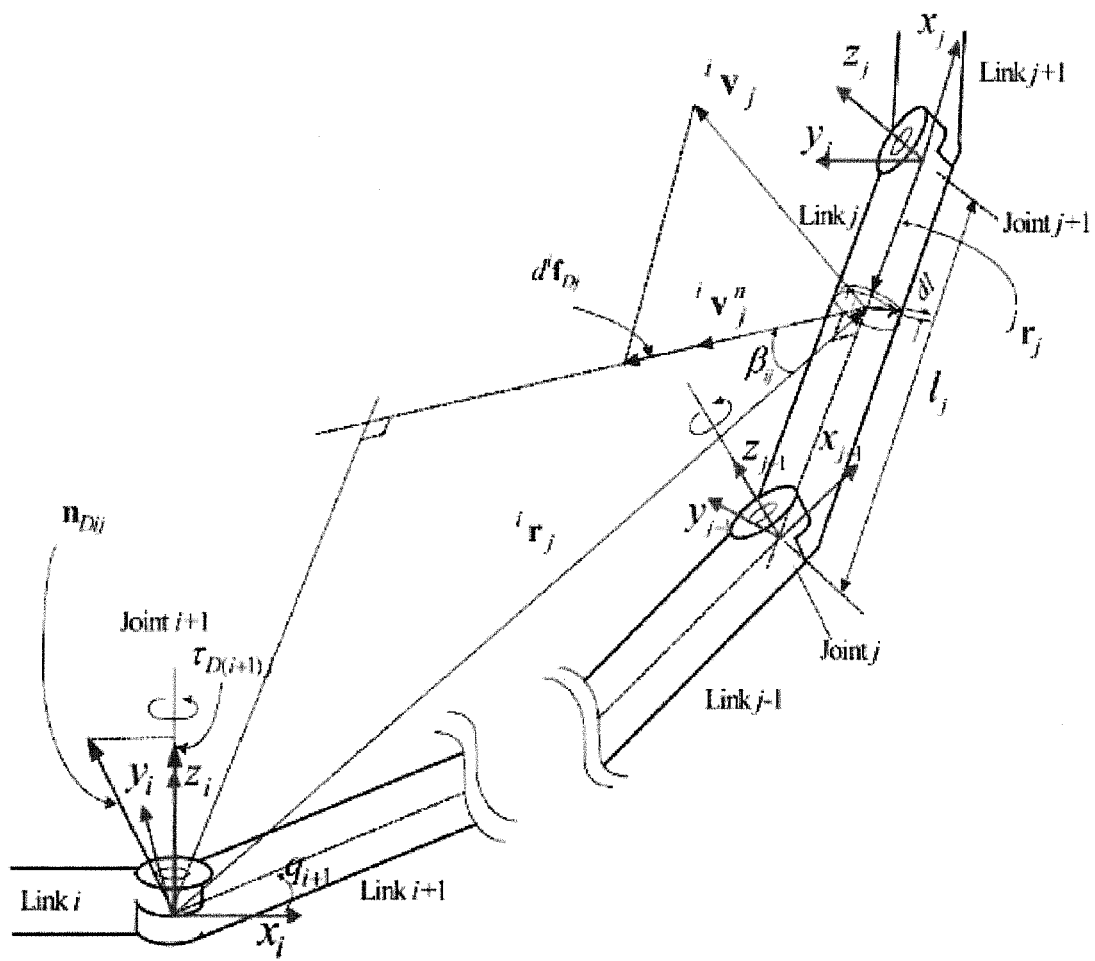
FIG. 5 shows a vector diagram of underwater links and a link coordinates system of the multi-joint underwater robot having the complex movement function according to the present invention.

FIG. 5 shows a vector diagram of underwater links and a link coordinates system of the multi-joint underwater robot having the complex movement function according to the present invention.

Referring to FIG. 5, when the underwater robot swims or walks with multi-legs having multi-joints under water, the path plan and the control of the joints based on the hydrodynamic force are required. To this end, the modeling of the hydrodynamic force acting on the leg-link must be essentially first performed. The dynamic equation of the arms of the underwater root may be expressed as Equation (1) by applying hydrodynamic force to the dynamic equation of a robot on the ground.

$$M(q)\ddot{q}+C(q,\dot{q})+D(q,\dot{q})+G(q)=\tau \qquad \text{Equation 1}$$

In Equation 1, M denotes an inertia matrix including an additional mass, C denotes corioils's force and centrifugal force, D denotes fluid resistance and lift force, G denotes buoyancy and gravity, and $\tau$ denotes joint torque. The fluid resistance and the lift force become the functions of the joint angle, the joint angular velocity, the fluid rate, and the hydrodynamic force coefficient according to a link shape. In order to define this, the link is split into thin circular plates, and the hydrodynamic force acting on each circular plate is approximately expressed, thereby approximating hydrodynamic force acting on the link through the integral of the hydrodynamic force acting on each circular plate. The coordinates, the speed, and the force vector of the link of the underwater robot are shown in FIG. 5, and the fluid resistance acting on a $j^{th}$ link may be expressed as Equation 2 for $i^{th}$ coordinates.

$$^{i}f_{D_j} = -\frac{1}{2}\rho \int_0^{l} C_{D_j}(\sigma_j) d_{pj} \|{}^{i}v_j^n\| \, {}^{i}v_j^n \, dl \qquad \text{Equation 2}$$

In Equation 2, $C_{Dj}$ denotes a 2-D fluid resistance coefficient of a $j^{th}$ link, and Xx denotes the angle between the velocity of the circular plate of the $j^{th}$ link and the fluid rate vector. In addition, $d_{pj}$ denotes the length obtained by projecting the circular plate on the vector having a right angle to ${}^{i}v_j^n$. In addition, ${}^{i}v_j^n$ is a translation velocity component of a circular plate having the right angle to the length direction of the $j_{th}$ link. Accordingly, the hydrodynamic torque acting on an $i^{th}$ joint may be expressed as Equation 3 by taking into consideration the location vector ${}^{i}r_j$ of the circular plate.

$$^{i}n_{D_{ij}} = -\frac{1}{2}\rho C_{D_j}(\sigma_j) d_{pj} \int_0^{l} {}^{i}r_j \times \|{}^{i}v_j^n\| \, {}^{i}v_j^n \, dl \qquad \text{Equation 3}$$

If the velocity vector to determine the hydrodynamic force and the hydrodynamic torque is expressed as a joint angular vector, generalized torque may be obtained, and the fluid resistance item D of Equation 1 may be approximately found.

Walking Path Plan to Optimize Hydrodynamic Force

If a path is planned to optimize hydrodynamic force acting on a link under water, the efficiency of energy consumed in walking or swimming can be increased. Since the link receives hydrodynamic force under water, which is 1000 times that of the air, the hydrodynamic force is optimized to improve the efficiency of a system, which is another core technology. In walking, redundancy is utilized in the gait plan based on the hydrodynamic force. In swimming, the angle and the velocity of the joint are planed to maximize the thrust acting on the body by the hydrodynamic force acting on the swimming. The walking plan to optimize the hydrodynamic force may be formulated as follows. In other words, a joint path parameter is found to satisfy the conditions of following inequality given in Equation 4, to satisfy the joint restriction conditions given according to gait and to minimize the object function g of the hydrodynamic force expressed in Equation 5 and acting on the leg moving under water.

$$\theta_{i,min} \leq \theta_i \leq \theta_{i,max} (i=1,\ldots,n)$$
$$\dot{\theta}_{i,min} \leq \dot{\theta}_i \leq \dot{\theta}_{i,max} (i=1,\ldots,n)$$
$$\ddot{\theta}_{i,min} \leq \ddot{\theta}_i \leq \ddot{\theta}_{i,max} (i=1,\ldots,n)$$
$$\tau_{i,min} \leq \tau_i \leq \tau_{i,max} (i=1,\ldots,n) \quad \text{Equation 4}$$

$$g = \int_0^T \|D(C_D, q, \dot{q})\| \quad \text{Equation 5}$$

Control for Correction of Posture to Cope with External Force

Since the main concept of the crabster is to maintain the stable posture under tidal currents differently from a propeller scheme, a technology of controlling the correction of the posture to cope with external force such as tidal current is a core technology.

Figure 6:
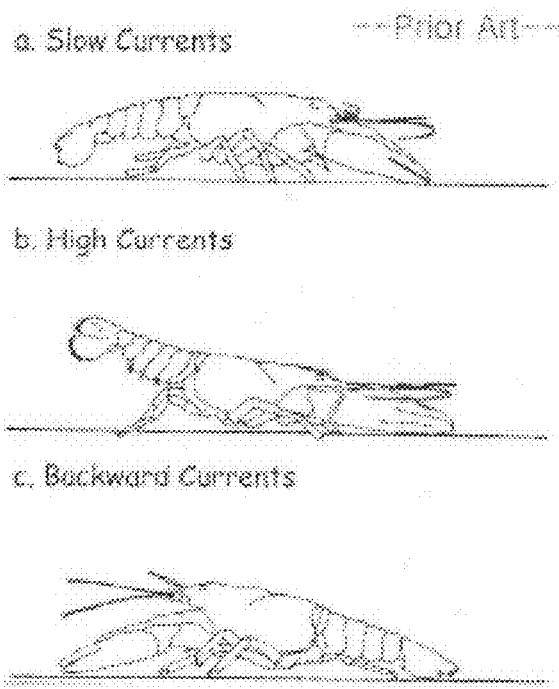
FIG. 6 schematically illustrates the correction of the posture for fluid currents, in which the postures of the underwater robot in slow currents, high currents, and backward currents, respectively, are shown.

FIG. 6 schematically illustrates the correction of the posture for fluid currents, in which the postures of the underwater robot in slow currents, high currents, and backward currents, respectively, are shown.

Figure 7:
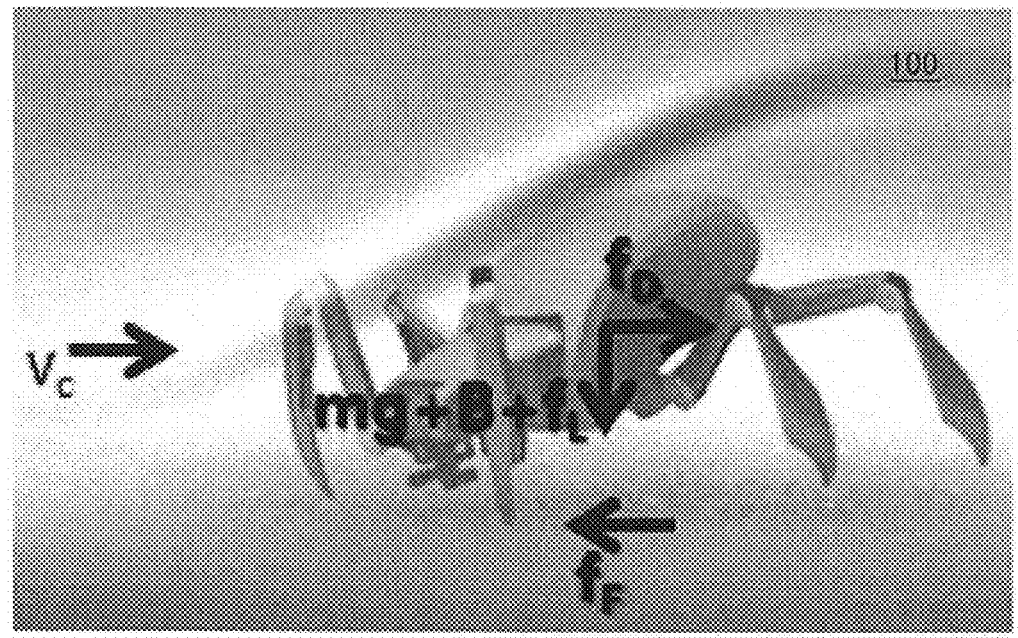
FIG. 7 is a schematic view showing that the posture of the multi-joint underwater robot having the complex movement function according to the present invention is corrected to cope with the hydrodynamic force.

FIG. 7 is a schematic view showing that the posture of the multi-joint underwater robot having the complex movement function according to the present invention is corrected to cope with the hydrodynamic force.

The scheme of correcting the posture of the lobster is introduced as an approaching scheme in which the underwater robot maintains the stable posture, and is not overturned or swept by tidal current under the sea having tidal currents. A lobster changes the posture thereof according to the intensity of the flow rate and the direction of a fluid to adjust the landing force thereof. If the lift force and the fluid resistance are obtained according to the postures of the body through the above-described CFD scheme, the underwater working conditions can be deduced from the lift force and the fluid resistance. The condition that the underwater robot is not swept by tidal currents is to allow the frictional force applied to the end portion of the landed foot by the weight of the underwater robot and the lift force to be greater than the fluid resistance. In other words, the relation of Equation 6 can be obtained from FIG. 7.

$$(mg+B+f_F) \leq f_D + f_E, f_F = \mu f_L \quad \text{Equation 6}$$

In Equation 6, m denotes the mass of the underwater robot, g denotes the gravity acceleration, B denotes the buoyancy of the underwater robot, $f_F$ denotes the landing frictional force of the underwater robot to the seafloor, $f_D$ denotes the fluid resistance, $f_E$ denotes other external force component, $\mu$ denotes a landing friction coefficient, and $f_L$ denotes lift force acting on the underwater robot. Since $f_D$ and $f_E$ in Equation 6 are functions of the flow rate and the posture of the underwater robot, the posture of the underwater robot is corrected to satisfy the inequality of Equation 6 so that the underwater robot can overcome the tidal currents. In order to realize the posture correction function of the underwater robot, a flow rate sensor (or velocity sensor), a force/torque sensor, a posture sensor (or posture and movement measuring sensor), and a landing force sensor (or moment sensor) are mounted in the underwater robot. Referring to FIG. 7, the multi-joint underwater robot 100 changes the posture thereof by using the multi-joint walking legs to overcome the tidal currents. The multi-joint underwater robot bends the body thereof forward to cope with the tidal currents approaching from the front.

The multi-joint underwater robot having the complex movement function according to the present invention has six legs and the two front legs of the multi-joint underwater robot are used as robot arms. In addition, the multi-joint underwater robot moves while walking closely to the seafloor, overcomes the disturbance caused by tidal currents by using the shape and the posture of the body, and performs the underwater works in the stable posture. Four core technologies of the underwater robot according to the present invention are an underwater joint mechanism, the analyzing and the modeling of the hydrodynamic force, the walking path plan to optimize the hydrodynamic force, and the control for the correction of the posture to cope with external force.

Figure 8:
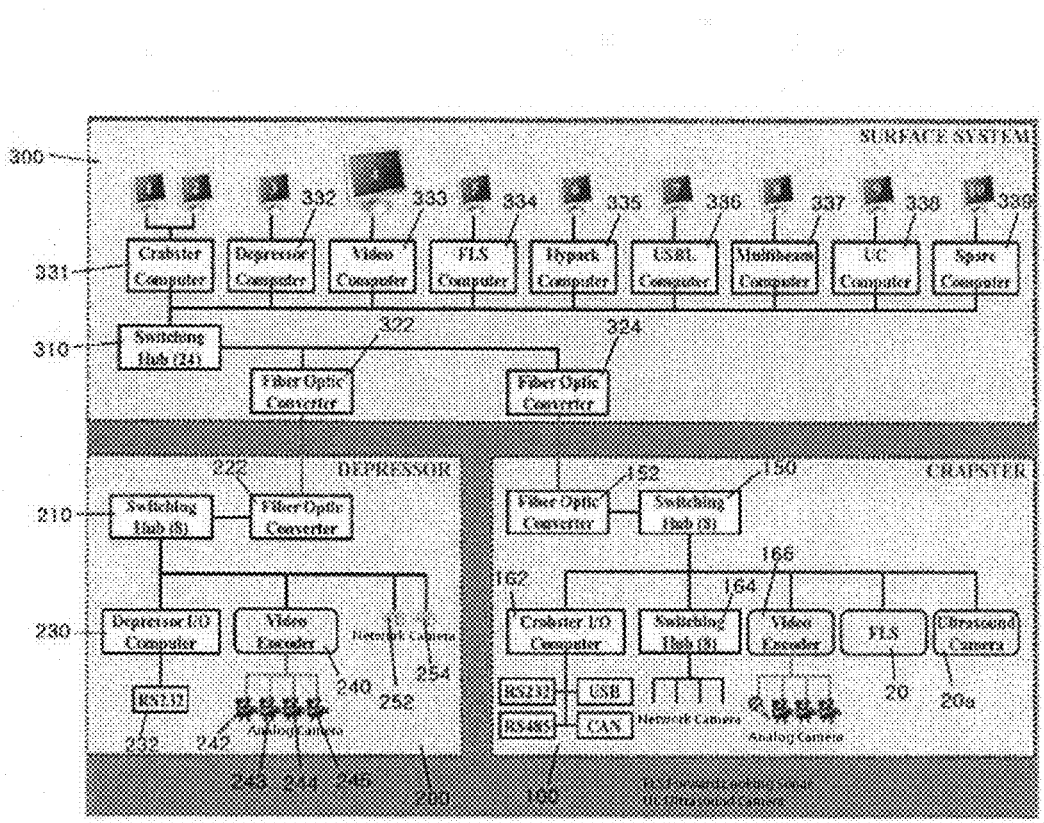
FIG. 8 is a detailed block diagram of an underwater exploration system using the multi-joint underwater robot according to an exemplary embodiment of the present invention.

FIG. 8 is a detailed block diagram of an underwater exploration system using the multi-joint underwater robot according to an exemplary embodiment of the present invention.

Referring to FIG. 8, the multi-joint underwater robot 100 includes a switching hub 150 to switch a plurality of signals and an optical fiber converter 152 to transmit an optical signal, in addition to the components shown in FIG. 3. The switching hub 150 is connected to a computer 162 connected to RS232 and RS485 devices and USB and CAN devices to process input and output signals, a switching hub 164 connected to a plurality of network cameras, a video encoder 166 connected to a plurality of analog cameras, a forward looking sonar (FLS) 20 or a forward scanning sonar, and an ultrasonic camera 20a.

The depressor 200 is connected to a switching hub 210 to switch a plurality of signals, an optical fiber converter 222 to transmit an optical signal, a computer 230, which processes input and output signals, connected to the RS232, a videoencoder 240 connected to a plurality of analog cameras 242, 243, 244, and 245, and a plurality of network cameras 252 and 254.

The mother ship 300 is connected to a plurality of computers 331 to 339 and includes a switching hub 310 connected to optical converters 322 and 324. The optical fiber converter 322 is connected to the optical fiber converter 222 of the depressor 200, and the optical fiber converter 324 is connected to the optical converter 152 of the underwater robot 100-1. The computers include a computer 331 for the underwater robot, a computer 332 for the depressor, a video computer 333, a sonar computer 334, a Hypack computer 335, a USBL computer 336, a multi-beam computer 337, a UC computer 338, and a preliminary computer 339.

The system for observing the seafloor topography is constructed through the underwater exploration system including the underwater robot 100, the depressor 200, and the mother ship 300 having the above connection structure, and the underwater robot 100-1 is controlled to obtain data of the seafloor topography.

Figure 9:
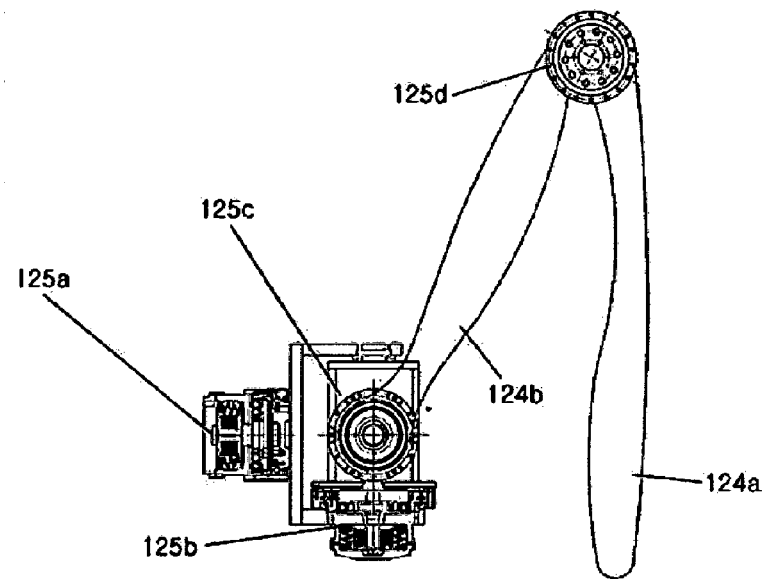
FIG. 9 is a detailed view showing the joint part of the robot leg of the multi-joint underwater robot according to the exemplary embodiment of the present invention.
Figure 11:
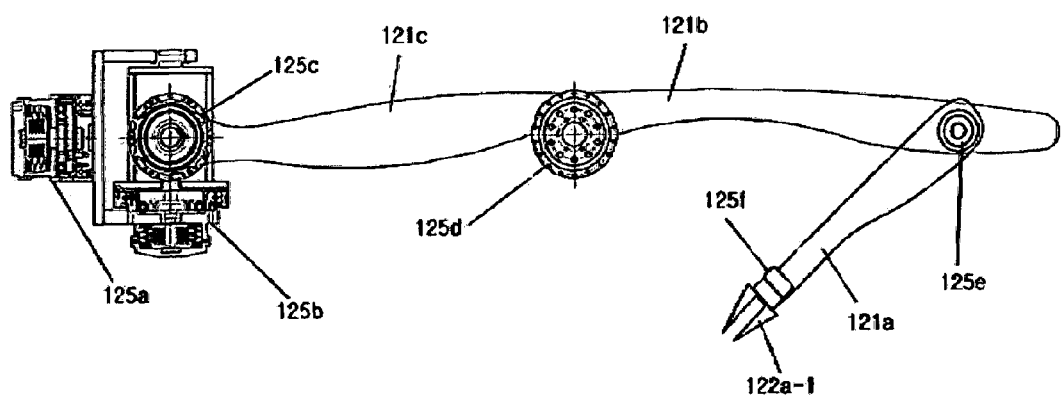
FIG. 11 is a detailed view showing the joint part of the leg used as a robot arm according to the exemplary embodiment of the present invention.
Figure 12:
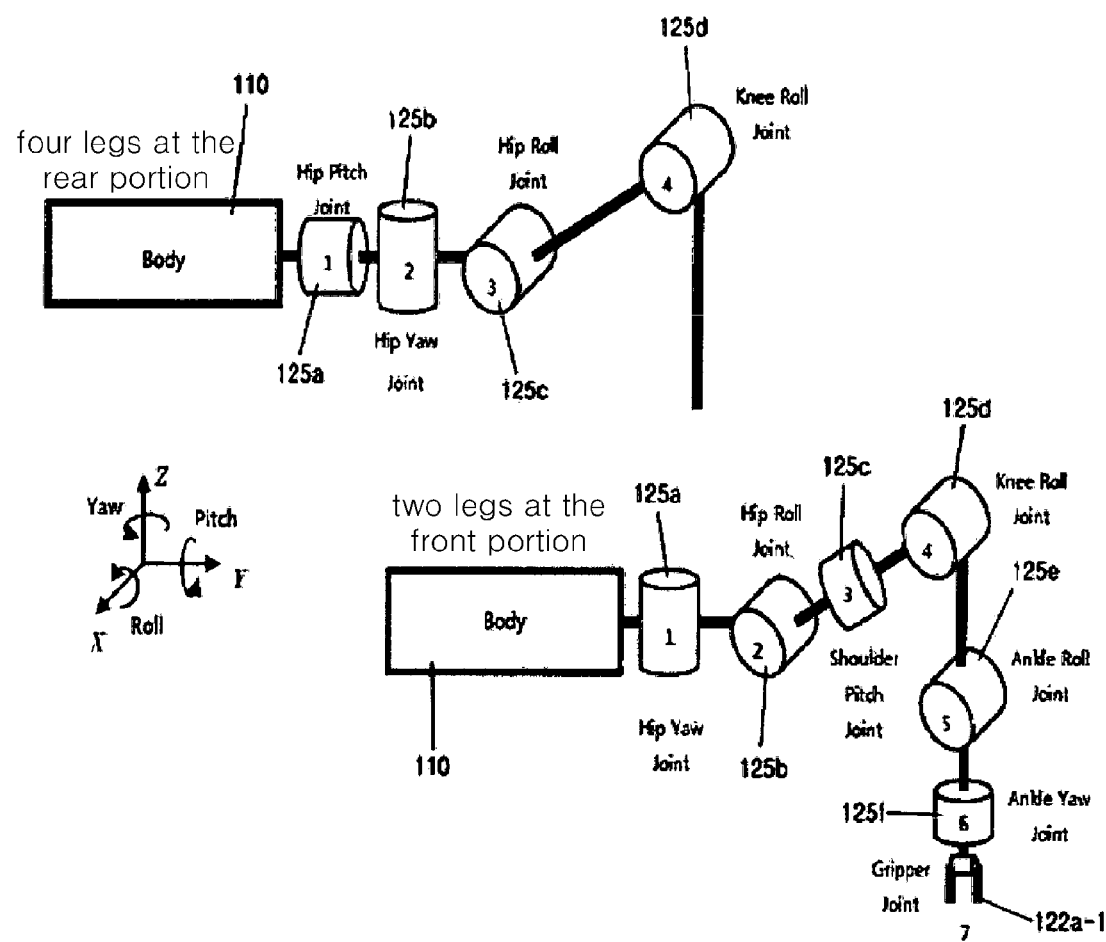
FIG. 12 is a view showing the mechanical structure of the robot leg and a robot leg used as a robot arm according to the exemplary embodiment of the present invention.

FIG. 9 is a detailed view showing the joint part of the robot leg of the multi-joint underwater robot according to the exemplary embodiment of the present invention. FIG. 10 is a side view showing a portion of a pressure-resistant and waterproof joint structure including the electrical motor and the harmonic reducer of the multi-joint underwater robot according to the exemplary embodiment of the present invention. FIG. 11 is a detailed view showing the joint part of the leg used as the robot arm according to the exemplary embodiment of the present invention. FIG. 12 is a view showing the mechanical structure of the robot leg and the robot leg used as the arm according to the exemplary embodiment of the present invention.

Referring to FIG. 9, the joint part of the robot leg of the multi-joint underwater robot according to the exemplary embodiment of the present invention includes a first joint 125a, a second joint 125b, a third joint 125c, and a fourth joint 125d. The robot leg 124a is connected to the fourth joint 125d, and the robot leg 124b is connected between the third and fourth joints 125c and 125d.

The first joint 125a, the second joint 125b, and the third joint 125c are water-proofed and assembled through the pressure-resistant and waterproof joint structure.

Referring to FIG. 10, the first joint 125a, the second joint 125b, and the third joint 125c are waterproofed and assembled through the pressure-resistant and waterproof joint structure. In detail, the pressure-resistant and waterproof joint structure includes first to fourth waterproof bodies 410, 420, and 430. In the first waterproof body 410, the frameless BLDC motor 72-1 is surrounded by a waterproof O-ring 414 to make contact with the inner part of the pressure-resistant and waterproof housing 418 and mounted through a bearing 412. A reducer 74-1 to reduce the driving force of the frameless BLDC motor 72-1 is rotatably coupled with the inner part of the pressure-resistant and waterproof housing 418 through the bearing 412.

Referring to FIG. 11, a joint part of the robot leg used as a robot arm according to the exemplary embodiment of the present invention includes a first joint 125a, a second joint 125b, a third joint 125c, a fourth joint 124d, a fifth joint 125e, and a sixth joint 125f. A gripper 122a-1 is connected to the end portion of the sixth joint 125f, and the robot leg 121c is connected between the third and fourth joints 125c and 125d. The robot leg 121b is connected between the fourth and fifth joints 125d and 125e, and the robot leg 121a is connected between the fifth and sixth joints 125e and 125f.

The first to third joints 125a to 125c are water-proofed and assembled through the pressure-resistant and waterproof joint structure (see FIG. 10). Other joints are assembled through the pressure-resistant and waterproof structure. The feedback of each joint may be sensed through the limit sensor mounted in the joint, and the limit sensor may include a hall sensor (not shown).

Hereinafter, the mechanical structure of the robot leg and the robot leg used as an arm according to the exemplary embodiment of the present invention will be described.

Referring to FIG. 12, four robot legs are connected to the underwater robot body 110, and two robot legs used as arms are connected to the front portion of the underwater robot body 110. The robot legs perform roll, pitch, and yaw rotation motions about X, Y, and Z axes, respectively.

Summarizing again, the multi-joint underwater robot 100-1 having the complex movement function according to the embodiment of the present invention has six legs and 28 joints in total and actively walks under water. Each joint is driven by the first to $N^{th}$ electrical motors 72-1, . . . , and 72-N. The technology of mechanically and electrically designing and controlling the joints of the multi-joint underwater robot is referred to as "underwater mechanism technology". A joint mechanism technology applied to a land is expanded or redesigned so that the joint mechanism technology is applicable under seawater.

The joint mechanism refers to a joint mechanism applied to each of six legs of the multi-joint underwater robot according to the present invention as shown in FIG. 2. Each leg has a link structure of four joints, and the two front legs have link structures of six joints. The joints constituting the two front legs are utilized when the two front legs are used for robot arms.

Each joint mechanism includes joint driving motors 72-1, . . . , and 72-N, harmonic reducers 74-1, . . . , and 74-N, joint angular sensors 76-1, . . . , and 76-N, and joint limit sensors 78-1, . . . , and 78-N. The joint driving motor includes a frameless BLDC motor to obtain a low speed and a high toque with lightweight in small size, and is mounted in a pressure-resistant and waterproof housing that is designed. The pressure-resistant and waterproof housing is water-tightened by using an O-ring. To minimize the backlash of the joint and obtain a proper deceleration ratio, the harmonic drive reducer is employed. In addition, an electric encoder providing an absolute angle is mounted at the reducer output side of the joint to obtain the absolute of the joint. For safety, a magnetic type of proximity switch is mounted in a joint angular limit.

The electrical motors of the six joints 125f mounted in the robot legs used as the arms are used to operate grippers.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Accordingly, the right scope of the present invention should be judged based on the scope of following claims.

INDUSTRIAL APPLICABILITY

In the underwater exploration system using the multi-joint underwater robot having the complex movement function according to the present invention, the underwater robot has six legs of a novel concept completely different from a conventional propeller propulsion scheme to move closely to the seafloor, overcome tidal currents while maintaining the posture thereof by using the posture and motion sensor, and swim and walk under water. In addition, the underwater robot transmits underwater data to the mother ship on the ground via the depressor through the communication unit in real time, thereby performing underwater exploration in shallow sea and deep sea.

Further, in the underwater exploration system using the multi-joint underwater robot having the complex movement function according to the present invention, ultrasonic image equipment is mounted in the underwater robot, so that a search work is possible even under the water representing high turbidity. The two front legs are used as robot arms, so that the underwater exploration can be effectively performed in the shallow sea and the deep sea.

The invention claimed is:
1. A multi-joint underwater robot having a complex movement function, the multi-joint underwater robot comprising:
 a streamlined body;
 multi-joint walking legs mounted at left and right sides and a front side of the body, each of the walking legs having multiple joints;
 a control unit mounted in the body to control a walking state and a swimming state through the multi-joint walking legs;
 a walking leg driving unit controlled by the control unit and generating a driving signal to drive the multi-joint walking legs;

a sensing unit mounted in the body to sense a posture of the body and contact of the body with an external object;

a buoyancy sensing unit mounted in the body to sense buoyancy of the body; and a communication unit to transceive wired and wireless signals with an external device, wherein the sensing unit comprises:

a force/moment sensor mounted between the body and the legs of the multi-joint underwater robot;

a landing force sensor mounted in an end portion of the legs; and a moment sensor mounted at two front legs among the multi-joint walking legs of the multi-joint underwater robot to sense landing of the front legs, and wherein each leg of the multi-joint walking legs has a link structure of four joints, and the two front legs of the multi-joint walking legs have link structures of six joints, the joints constituting the two front legs are utilized when the two front legs are used for robot arms, which perform roll, pitch, and yaw rotation motions about X, Y, and Z axes, respectively, and wherein a joint mechanism of the multi-joint walking legs comprises:

joint driving motors including frameless BLDC motors;

harmonic drive reducers minimizing backlashes of the multi-joints and obtaining proper deceleration ratios;

electric encoders, mounted at the harmonic drive reducers output side, obtaining absolute angles of the multi-joints from the harmonic drive reducers and providing the absolute angles; and joint limit sensors, mounted at the multi-joints, comprising magnetic proximity switches sensing feedbacks of the multi-joints.

2. The multi-joint underwater robot of claim 1, wherein an ultrasonic camera is mounted at a front surface of the body.

3. The multi-joint underwater robot of claim 1, wherein the sensing unit comprises a posture sensor and a motion measuring sensor.

4. The multi-joint underwater robot of claim 1, wherein the sensing unit comprises an underwater location tracking device.

5. The multi-joint underwater robot of claim 1, further comprising a photographing unit mounted at a front surface of the body to photograph an underwater image, wherein the photographing unit comprises an underwater camera having a pan/tilting function, and a lighting device.

6. The multi-joint underwater robot of claim 1, wherein the communication unit comprises an optical communication modem.

7. The multi-joint underwater robot of claim 1, wherein the communication unit is connected to a depressor through a secondary cable including an optical fiber and a power line.

8. The multi-joint underwater robot of claim 1, wherein the body includes a light-weight and high-strength complex fiber.

9. The multi-joint underwater robot of claim 1, wherein the buoyancy sensing unit variably adjusts a weight of the multi-joint underwater robot in a range of −10 kg to +10 kg, and the two front legs among the multi-joint walking legs have grippers such that the front legs selectively have a robot arm function.

10. An underwater exploration system using a multi-joint underwater robot having a complex movement function, the underwater exploration system comprising:

the multi-joint underwater robot having the complex movement function comprising:

a streamlined body;

multi-joint walking legs mounted at left and right sides and a front side of the body, each of the multi-joint walking legs having multiple joints;

a control unit mounted in the body to control a walking state and a swimming state through the multi-joint walking legs;

a walking leg driving unit controlled by the control unit and generating a driving signal to drive the multi-joint walking legs;

a sensing unit mounted in the body to sense a posture of the body and contact of the body with an external object, the sensing unit comprising:

a force/moment sensor mounted between the body and the legs of the multi-joint underwater robot;

a landing force sensor mounted in an end portion of the leg; and a moment sensor mounted at two front legs of the multi-joint underwater robot to sense landing of the front legs;

a buoyancy sensing unit mounted in the body to sense buoyancy of the body; and a communication unit to transceive wired and wireless signals with an external device, wherein each leg of the multi-joint walking legs has a link structure of four joints, and the two front legs of the multi-joint walking legs have link structures of six joints, the joints constituting the two front legs are utilized when the two front legs are used for robot arms, which perform roll, pitch, and yaw rotation motions about X, Y, and Z axes, respectively, wherein a joint mechanism of the multi-joint walking legs comprises:

joint driving motors including frameless BLDC motors;

harmonic drive reducers minimizing backlashes of the multi-joints and obtaining proper deceleration ratios;

electric encoders, mounted at the harmonic drive reducers output side, obtaining absolute angles of the multi-joints from the harmonic drive reducers and providing the absolute angles; and joint limit sensors, mounted at the multi-joints, comprising magnetic proximity switches sensing feedbacks of the multi-joints;

a depressor; and a mother ship to store data of an underwater state transmitted from the multi-joint underwater robot and to monitor and control a movement direction of the multi-joint underwater robot, wherein the depressor is connected to the mother ship through a primary cable, the multi-joint underwater robot is connected to the depressor through a second cable, and resistance force of the primary cable is applied to the depressor without being transmitted to the multi-joint underwater robot.

11. The underwater exploration system of claim 10, wherein the multi-joint underwater robot further comprises:
- a first switching hub to switch a plurality of signals;
- an optical fiber converter to convert a received signal into an optical signal;
- a computer connected to the first switching hub to process input and output signals;
- RS232, RS485, USB, and/or CAN devices connected to the computer;
- a second switching hub having one terminal connected to the first switching hub and an opposite terminal connected to a plurality of network cameras;
- a video encoder having one terminal connected to the first switching hub and an opposite terminal connected to a plurality of analog cameras;
- a forward scanning sonar serving as a forward looking sonar, connected to the first switching hub, photographing an image through a forward scanning work, and transmitting the image; and
- an ultrasonic camera connected to the first switching hub and photographing and transmitting a forward image.

12. The underwater exploration system of claim 10, wherein the depressor comprises:
- a switching hub switching a plurality of signals;
- an optical fiber converter connected to the switching hub to convert a signal, which is received through the switching hub, into an optical signal and to transmit the signal to the mother ship;
- a computer processing input and output signals and having one terminal connected to an RS232 and an opposite terminal connected to the switching hub;
- a video encoder having one terminal connected to a plurality of analog cameras and an opposite terminal connected to the switching hub; and
- a plurality of network cameras connected to the switching hub.

13. The underwater exploration system of claim 10, wherein the mother ship comprises first and second optical fiber converters having one terminal connected to a plurality of computers and an opposite terminal to transmit an optical signal, and the first and second optical fiber converters are connected to an optical fiber converter of the multi-joint underwater robot and an optical fiber converter of the depressor, respectively.

* * * * *